United States Patent
Chen et al.

(10) Patent No.: US 11,821,986 B1
(45) Date of Patent: Nov. 21, 2023

(54) TARGET TRACKING METHOD, SYSTEM, DEVICE AND STORAGE MEDIUM

(71) Applicant: Hubei University, Wuhan (CN)

(72) Inventors: Kansong Chen, Wuhan (CN); Lijun Xu, Wuhan (CN); Yao Xiang, Wuhan (CN); Yan Zhang, Wuhan (CN)

(73) Assignee: Hubei University, Wuhan (CN)

( * ) Notice: Subject to any disclaimer, the term of this patent is extended or adjusted under 35 U.S.C. 154(b) by 0 days.

(21) Appl. No.: 18/336,899

(22) Filed: Jun. 16, 2023

(51) Int. Cl.
| | |
|---|---|
| *G06F 7/02* | (2006.01) |
| *G06F 18/2134* | (2023.01) |
| *G06N 3/08* | (2023.01) |
| *G06N 3/0985* | (2023.01) |
| *G06F 17/14* | (2006.01) |
| *G01S 17/66* | (2006.01) |
| *G06T 7/246* | (2017.01) |
| *G01S 17/00* | (2020.01) |

(52) U.S. Cl.
CPC .......... *G01S 17/66* (2013.01); *G01S 17/006* (2013.01); *G06F 7/023* (2013.01); *G06F 18/21345* (2023.01); *G06N 3/08* (2023.01); *G06N 3/0985* (2023.01); *G06T 7/251* (2017.01); *G06F 17/147* (2013.01); *G06T 2207/20024* (2013.01); *G06T 2207/20056* (2013.01); *G06T 2207/20081* (2013.01)

(58) Field of Classification Search
None
See application file for complete search history.

(56) References Cited

U.S. PATENT DOCUMENTS

2021/0166402 A1* 6/2021 Ricco .................. G06T 7/246

FOREIGN PATENT DOCUMENTS

| CN | 113344973 A | | 9/2021 | |
|---|---|---|---|---|
| CN | 110555864 B | * | 4/2022 | ............ G06T 7/246 |
| CN | 114359347 A | | 4/2022 | |
| CN | 115239760 A | * | 10/2022 | |

OTHER PUBLICATIONS

Machine Translation of CN-115239760-A from STIC (Year: 2022).*
Machine Translation of CN-110555864-B from STIC (Year: 2022).*
(Continued)

*Primary Examiner* — Tyler W. Sullivan
(74) *Attorney, Agent, or Firm* — Nitin Kaushik

(57) ABSTRACT

The present invention provides a target tracking method, system, device and storage medium, which includes: Determining a target area based on the current frame of a training sample, extracting and fusing histogram of oriented gradient (HOG), color naming (CN), and color space HSV features of the target area to obtain a target template; Determining a target function according to the target template and a spatial regularization weight factor; Introducing the Sherman-Morrison formula into the alternating direction method of multipliers (ADMM) to accelerate the solution of the target function and obtain the response value; Iterating the target tracking model when the response value meets the preset confidence threshold until training is completed to obtain a trained target tracking model, and tracking the target in the video to be observed by using the trained target tracking model.

7 Claims, 12 Drawing Sheets

(56) References Cited

OTHER PUBLICATIONS

Title of the Item: Acta Optica Sinica Publication Date: Feb. 29, 2020 Name of the Author: Hu Zhaohua et al. Article Title: Correlation Filter Tracking Algorithm Based on Temporal Awareness and Adaptive Spatial Regularization pp. 0315003-1-0315003-10.
Title of the Item: Acta Optica Sinica Publication Date: Apr. 30, 2019 Name of the Author: Mao Ning et al. Article Title: Spatial Regularization Correlation Filtering Tracking via Deformable Diversity Similarity pp. 0415002-1-0415002-11.

* cited by examiner

TARGET TRACKING METHOD, SYSTEM, DEVICE AND STORAGE MEDIUM

CROSS-REFERENCE TO RELATED APPLICATIONS

The application claims priority to Chinese patent application No. 2022106926728, filed on Jun. 17, 2022, the entire contents of which are incorporated herein by reference.

TECHNICAL FIELD

The present invention relates to the field of image recognition technology, and more specifically, to a target tracking method, system, device and storage medium.

BACKGROUND

With the development of computer technology, the theory and technology of artificial intelligence are increasingly mature, and its application fields are also expanding. The fields involved include robots, language recognition, image recognition, natural language processing, expert systems, etc. Target tracking is one of the hot spots in the field of computer vision research. Target tracking refers to the detection, extraction, recognition and tracking of moving targets in image sequences to obtain the motion parameters of moving targets and achieve behavioral understanding of moving targets. It has a wide range of applications in military guidance, video surveillance, robot visual navigation, human-machine interaction, and medical diagnosis.

The current visual target tracking algorithms can be further classified into two categories, generative and discriminative, according to their observation models. The generative tracking algorithm is to model the target area in the current frame, and to find the most similar area to the model in the next frame is to predict the position. In contrast to the generative algorithm, the discriminant tracking algorithm regards the tracking task as a classification problem in target detection, trains the classifier through the appearance representation of foreground and background, and then determines the target state according to the response of the classifier.

However, in existing visual target tracking algorithms for targets, there are often boundary effects in the samples after the cyclic displacement of the relevant filtering center image block. Therefore, how to weaken the boundary effects is an urgent problem to be solved.

SUMMARY

The present invention provides a target tracking method, system, electronic device and storage medium for solving the problem of weakening boundary effects in the existing technology.

According to the first aspect of the present invention, a target tracking method is provided, comprising:

Determining a target area based on the current frame of a training sample, extracting and fusing histogram of oriented gradient (HOG), color naming (CN), and color space HSV features of the target area to obtain a target template;

Determining a target function according to the target template and a spatial regularization weight factor;

Introducing the Sherman-Morrison formula into the alternating direction method of multipliers (ADMM) to accelerate the solution of the target function and obtain the response value;

Iterating the target tracking model when the response value meets the preset confidence threshold until training is completed to obtain a trained target tracking model, and tracking the target in the video to be observed by using the trained target tracking model.

On the basis of the above technical scheme, the following improvements can also be made to the present invention.

Optionally, the step of determining the target function according to the target template and spatial regularization weight factor includes:

The loss function after introducing weight factor $\theta$ is:

$$\psi_t(\omega) = \frac{1}{2}\sum_{t=1}^{t}\|f(x_i) - y_i\|^2 + \frac{1}{2}\sum_{j=1}^{d}\|\theta \odot \omega^j\|^2;$$

Where, $\odot$ is the dot product operation, $\psi_i$ is the training error of the classifier at the t-th frame, t is the sequence number of the current frame, i is the sequence number of the history frame, $x_i$ is the input sample of the i-th frame, $f(x_i)$ is the response score after the input sample of the i-th frame, $y_i$ is the expected response of the sample of the i-th frame, $\omega$ is the trained filter coefficient, j is the number of channels of the filter, d is the dimension of the classifier, and the regularization weight is defined as:

$$\theta(m,n) = \theta_{base} + \theta_{shift}(m,n);$$

Where, m,n represents the offset of cyclic samples, $\theta_{base}$ represents the basic weight of spatial regularization as a constant, and $\theta_{shift}$ represents the regularization weight offset of training samples;

$\theta_{shift}$ is defined as:

$$\theta_{shift}(m, n) = \theta_{width}\left(\frac{m}{\rho_{width}}\right)^2 + \theta_{height}\left(\frac{n}{\rho_{height}}\right)^2;$$

Where, m,n represents the offset of the cyclic sample, $\rho_{width}$ an $\rho_{height}$ represent the width and height of the search image, $\theta_{width}$ an $\theta_{height}$ represent the weight factors of the horizontal and vertical methods, respectively. The farther the training sample is from the target center, the greater the $\theta_{shift}$ value is, that is, the greater the regularization weight of the background area and the smaller the weight of the target area.

Optionally, the steps of introducing the Sherman-Morrison formula into the alternating direction method of multipliers (ADMM) to accelerate the solution of the target function and obtain the response value include:

Constructing auxiliary variable $\beta$ and substituting the auxiliary variable $\beta$ into the loss function of the filter to obtain the converted loss function;

Performing Fourier transform of the loss function to obtain the corresponding frequency domain formula;

Constructing an augmented Lagrange function based on the frequency domain formula, and introducing the Sherman-Morrison formula into the alternating direction method of multipliers (ADMM) to accelerate the solution of the Lagrange function and obtain the response value.

Optionally, the steps of introducing Sherman-Morrison formula into the alternating direction method of multipliers (ADMM) to accelerate the solution of the Lagrange function include:

Using the alternating direction method of multipliers (ADMM) to decompose the augmented Lagrange function into multiple subproblems;

Decomposing each subproblem into preset multiple independent small targets based on the banded sparse matrix of the samples;

Accelerating the solution of each independent small target according to the Sherman-Morrison formula.

Optionally, substituting the auxiliary variable β into the loss function of the filter to obtain the converted loss function, which is:

$$\underset{\omega,\beta}{\operatorname{argmin}} \frac{1}{2} \sum_{i=1}^{t} \left\| \sum_{j=1}^{d} x_i^j * \beta^j - y_i \right\|^2 + \frac{1}{2} \sum_{j=1}^{d} \left\| \theta \odot \omega^j \right\|^2;$$

$$\text{s.t. } \beta = \omega;$$

Where, ⊙ is the point multiplication operation, ω is the trained filter coefficient, β is the auxiliary variable, t represents the sequence number of the current frame, i represents the sequence number of the historical frame, d is the dimension of the classifier, j is the number of channels for the filter, $x_i$ is the input sample of the i-th frame, $y_i$ represents the expected response of the sample of frame i, and θ is the weight factor;

The corresponding frequency domain formula obtained by Fourier transformation of the loss function:

$$\underset{\omega,\hat{\beta}}{\operatorname{argmin}} = \frac{1}{2} \|\hat{y} - \hat{X}\hat{\beta}\|_2^2 + \frac{1}{2}\|\theta\omega\|_2^2;$$

$$\text{s.t. } \hat{\beta} = \sqrt{t}F\omega;$$

Where, ^ represents the Fourier transform of the variable, ω is the trained filter coefficient, β is the auxiliary variable, θ is the weight factor, the discrete Fourier transform of a one-dimensional signal a is represented as â=√tFa, wherein, F is the orthogonal Fourier transform matrix of size t×t, ŷ=[ŷ(1), ŷ(2), . . . , ŷ(t)], $\hat{X}$=[diag($\hat{x}_1$)$^T$, . . . , diag($\hat{x}_d$)$^T$], in size t×dt; which is a matrix composed of multi-channel cyclic samples, $\hat{\beta}$=[$\hat{\beta}_1^T$, . . . , $\hat{\beta}_d^T$], h=[$h_1^T$, . . . , $h_d^T$], in size dt×1;

The augmented Lagrangian function constructed based on the frequency domain formula is:

$$L(\omega, \hat{\beta}, \hat{\varsigma}) = \frac{1}{2}\|\hat{y} - \hat{X}\hat{\beta}\|_2^2 + \frac{1}{2}\|\theta\omega\|_2^2 + \hat{\varsigma}^T(\hat{\beta} - \sqrt{t}F\omega) + \frac{\mu}{2}\|\hat{\beta} - \sqrt{t}F\omega\|_2^2;$$

Where, μ is the penalty factor, $\hat{\varsigma} = [\hat{\varsigma}_1^T, \ldots, \hat{\varsigma}_K^T]^T$ is the Lagrangian vector in the Fourier domain of size dt×1, ^ represents the Fourier transform of the variable, ω is the trained filter coefficient, β is the auxiliary variable, θ is the weight factor, the discrete Fourier transform of a one-dimensional signal a is represented as â=√tFa, wherein, F is the orthogonal Fourier transform matrix of size t×t, ŷ=[ŷ(1), ŷ(2), . . . , ŷ(t)], $\hat{X}$=[diag($\hat{x}_1$)$^T$, . . . , diag($\hat{x}_d$)$^T$], in size t×dt, which is a matrix composed of multi-channel cyclic samples, $\hat{\beta}$=[$\hat{\beta}_1^T$, . . . , $\hat{\beta}_d^T$], h=[$h_1^T$, . . . , $h_d^T$], in size dt×1.

Using the alternating direction method of multipliers (ADMM) to decompose the augmented Lagrange function into multiple subproblems;

$$\hat{\beta} = \underset{\hat{\beta}}{\operatorname{argmin}} \frac{1}{2}\|\hat{y} - \hat{X}\hat{\beta}\|_2^2 + \hat{\varsigma}^T(\hat{\beta} - \sqrt{t}F\omega) + \frac{\mu}{2}\|\hat{\beta} - \sqrt{t}F\omega\|_2^2;$$

Where, μ is the penalty factor, $\hat{\varsigma} \times [\hat{\varsigma}_1^T, \ldots, \hat{\varsigma}_K^T]^T$ is the Lagrangian vector in the Fourier domain of size dt×1, ^ represents the Fourier transform of the variable, ω is the trained filter coefficient, β is the auxiliary variable, θ is the weight factor, the discrete Fourier transform of a one-dimensional signal a is represented as â=√tFa, wherein, F is the orthogonal Fourier transform matrix of size t×t, ŷ=[ŷ(1), ŷ(2), . . . , ŷ(t)], $\hat{X}$=[diag($\hat{x}_1$)$^T$, . . . , diag($\hat{x}_d$)$^T$], in size dt×1, which is a matrix composed of multi-channel cyclic samples, $\hat{\beta}$=[$\hat{\beta}_1^T$, . . . , $\hat{\beta}_d^T$], h=[$h_1^T$, . . . , $h_d^T$], in size dt×1, sample $\hat{X}$ is a banded sparse matrix, so each element in ŷ(s)=[ŷ(1), ŷ(2), . . . , ŷ(t)] is only related to k in $\hat{x}$(s)=$[\hat{x}_1(t), \ldots, \hat{x}_k(t)]^T$ and $\hat{\beta}(s) = [\operatorname{conj}(\hat{\beta}_1(t)), \ldots, \operatorname{conj}(\hat{\beta}_k(t))]^T$, operator conj applies complex conjugate to complex vector. Therefore, $\hat{\beta}$ in the above equation can be equivalent to t independent small targets $\hat{\beta}$(s), s=[1, . . . , t];

Decomposing each subproblem into preset multiple independent small targets based on the banded sparse matrix of the samples:

$$\hat{\beta}(s) = \underset{\hat{\beta}(s)}{\operatorname{argmin}}\left\{\frac{1}{2}\|\hat{y}(s) - \hat{x}(s)^T\hat{\beta}(s)\|_2^2 + \hat{\varsigma}(s)^T(\hat{\beta}(s) - \hat{\omega}(s)) + \frac{\mu}{2}\|\hat{\beta}(s) - \hat{\omega}(s)\|_2^2\right\};$$

Where, $\hat{\omega}(s) = [\hat{\omega}_1(s), \ldots, \hat{\omega}_k(s)]$ and $\hat{\omega}_k = \sqrt{t}F\omega_k$ solved as follows:

$$\hat{\beta}(s) = \frac{\hat{y}(s)\hat{x}(s) - t\hat{\varsigma}(s) + \mu t\hat{\omega}(s)}{\hat{x}(s)\hat{x}(s)^T + \mu t I_k};$$

Accelerating the solution of each independent small target according to the Sherman-Morrison:

$$\hat{\beta}(s) = \frac{1}{\mu}(t\hat{y}(s)\hat{x}(s) - \hat{\varsigma}(s) + \mu\hat{\omega}(s)) - \frac{\hat{x}(s)}{\mu b}(t\hat{y}(s)\hat{S}_x(s) - \hat{S}_\varsigma(s) + \mu\hat{S}_\omega(s));$$

Where, $\hat{S}_x(s) = \hat{x}(s)^T\hat{x}$, $\hat{S}_\varsigma(s) = \hat{x}(s)^T\hat{\varsigma}$, $\hat{S}_\omega(s) = \hat{x}(s)^T\hat{\omega}$, b=$\hat{S}_x$(s)+μt.

Optionally, including the steps of scale adaptation:

Constructing a scale pool based on the size of the template for the current frame in the training sample;

Performing sliding sampling on the next frame image in the training sample based on different scales in the scale pool to obtain samples of different scales;

Calculating the response values of samples at each scale based on the preset scale filter to obtain the samples at the scale with the highest response value;

The sample with the largest scale of the response value is adjusted to the same dimension as the template of the current frame by the bilinear interpolation to obtain the candidate region of the image of the next frame in the training sample.

Optionally, the steps of iterating a target tracking model when the response value meets a preset confidence threshold include:

Obtaining the correlation peak mean difference ratio (CPMDR) based on the distribution map corresponding to the response values;

Obtaining a model update rate based on the correlation peak mean difference ratio (CPMDR), and updating the target model based on the model update rate.

According to the second aspect of the present invention, a target tracking system is provided, comprising:

A construction template module, for determining a target area based on the current frame of a training sample, extracting and fusing histogram of oriented gradient (HOG), color naming (CN), and color space HSV features of the target area to obtain a target template;

A target function module, for determining a target function based on the target template and a spatial regularization weight factor;

A model training module, for introducing the Sherman-Morrison formula into the alternating direction method of multipliers (ADMM) to accelerate the solution of the target function and obtain the response value;

A target tracking module, for iterating the target tracking model when the response value meets the preset confidence threshold until training is completed to obtain a trained target tracking model, and tracking the target in the video to be observed by using the trained target tracking model.

According to the third aspect of the present invention, an electronic device is provided, comprising a memory and a processor, which are used to execute computer management programs stored in the memory and implement the steps of any target tracking method in the first aspect mentioned above.

According to the fourth aspect of the present invention, a computer-readable storage medium is provided, on which a computer management program is stored, and the computer management program, when executed by the processor, implements the steps of any target tracking method in the first aspect mentioned above.

The present invention provides a target tracking method, system, electronic device and storage medium, wherein the steps of the method include determining a target area based on the current frame of a training sample, extracting and fusing histogram of oriented gradient (HOG), color naming (CN), and color space HSV features of the target area to obtain a target template; determining a target function based on the target template and a spatial regularization weight factor; introducing the Sherman-Morrison formula into the alternating direction method of multipliers (ADMM) to accelerate the solution of the target function and obtain the response value; iterating the target tracking model when the response value meets the preset confidence threshold until training is completed to obtain a trained target tracking model, and tracking the target in the video to be observed by using the trained target tracking model. The present invention enhances the discriminability of feature response, improves the discrimination of targets, and enhances the stability of targets in deformation and light changes by extracting and fusing the features of histogram of oriented gradient (HOG), color naming (CN), and color space HSV in the target area, additionally, the present invention determines the target function through the spatial regularization based on the alternating direction method of multipliers (ADMM), so that while introducing the spatial regularization penalty boundary, the ADMM algorithm is used to reduce the iteration complexity, weaken the boundary effect, improve the operation efficiency of the algorithm, thus greatly improving the stability and tracking speed of the correlation filter tracking algorithm in target tracking.

DETAILED DESCRIPTION OF THE EMBODIMENTS

The following will provide a further detailed description of the specific embodiments of the present invention in conjunction with the accompanying drawings and embodiments. The following embodiments are used to illustrate the present invention, but are not intended to limit its scope.

Figure 1:
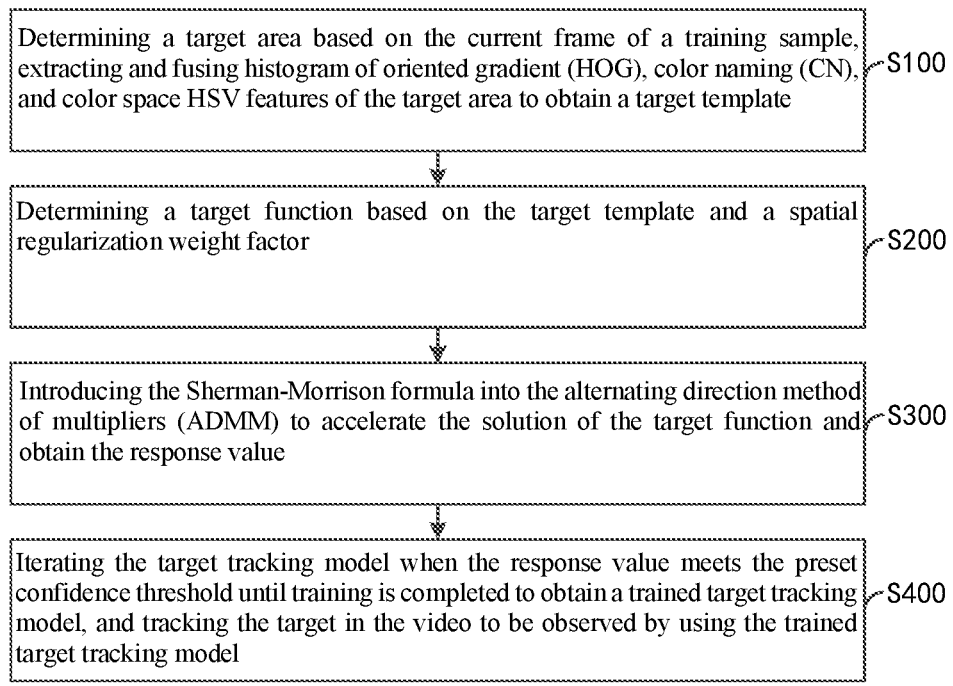
FIG. 1 shows a flowchart of a target tracking method provided by the present invention.

FIG. 1 shows a flowchart of a target tracking method provided by the present invention, as shown in FIG. 1, the method comprising:

Step S100: Determining a target area based on the current frame of a training sample, extracting and fusing histogram of oriented gradient (HOG), color naming (CN), and color space HSV features of the target area to obtain a target template;

It should be noted that the execution subject of the method in this embodiment may be a computer terminal device with data processing, network communication, and program running functions, such as a computer, tablet computer, etc; it may also be a server device with similar functions, or a cloud server with similar functions, which is not limited by this embodiment. For ease of understanding, this and the following embodiments will be illustrated with a server device as an example.

It will also be appreciated that the above training sample may be a training sample using the OTB50 dataset, or a training sample using the OTB100 dataset, or a training sample using the data collected by itself according to the actual needs, which is not limited by this embodiment.

It should be understood that the above histogram of oriented gradient (HOG) is a feature descriptor applied in the field of computer vision and image processing for target detection, and the above histogram of oriented gradient (HOG) technique is a statistical value used to calculate the orientation information of local image gradients. The HOG descriptor is computed on a grid-dense cell of uniform size, and an overlapping local contrast normalization technique is also used to improve performance.

Figure 2:
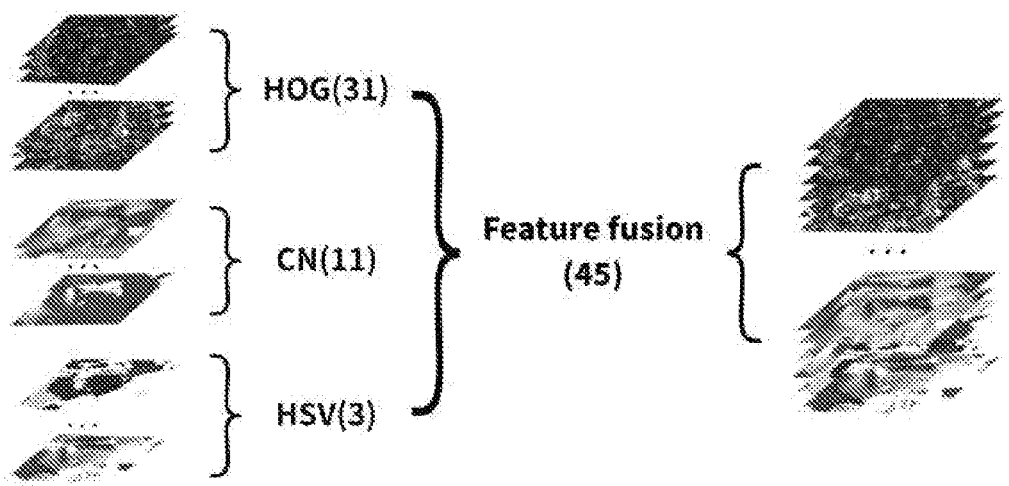
FIG. 2 shows a schematic diagram of the feature fusion process provided by the present invention.

It will also be appreciated that the above process of feature fusion may be to fuse the above three features to obtain the corresponding 45-dimensional integrated features, as shown in FIG. 2, which shows a schematic diagram of the feature fusion process provided by the present invention. In the above feature fusion, the embodiment of the present invention integrates HOG features representing gradient changes, color space (CN) for representing color information, and HSV space for representing more detailed information. The HOG feature is 31 dimensional (excluding all zero channels), the CN feature is 11 dimensional, and the HSV feature is 3 dimensional. By fusing these three features, a 45 dimensional integrated feature can be obtained, so the channel for the fused feature is 45.

Figure 3:
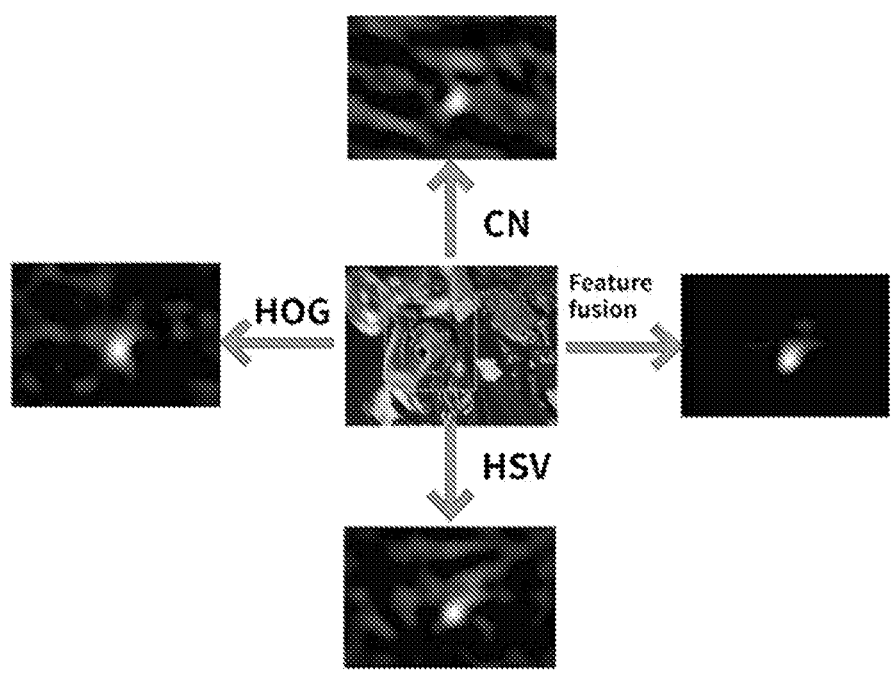
FIG. 3 shows a fusion response graph provided by the present invention.

Refer to FIG. 3, which shows the fusion response graph provided by the present invention. In FIG. 3, it can be seen that the response graph of a single feature is affected by a large amount of surrounding noise, resulting in the inability to accurately distinguish the target, while the fused feature response is more discriminative, improving the discrimination of the target.

Step S200: Determining a target function according to the target template and a spatial regularization weight factor;

In specific implementation, in the existing KCF correlation filtering algorithm, the regularization factor is a constant. During the training process, the regularization factor treats the samples in the background area as the same as the samples in the target area. However, in actual tracking, the target area is more weighted than the background area. Therefore, the regularization weight of the samples in the target area should be less than the regularization weight of the background part. For this reason, we introduce the spatial regularization weight factor and construct the spatial regularization correlation filter to weaken the interference of the background area and improve the classification ability of the classifier in the cluttered background. At the same time, we can also use this feature to expand the search area and solve the problem of target loss due to rapid movement.

Step S300: Introducing the Sherman-Morrison formula into the alternating direction method of multipliers (ADMM) to accelerate the solution of the target function and obtain the response value;

In the specific implementation, after determining the target function, it is necessary to solve the filter coefficients, which is the core problem in related filtering algorithms. With the continuous research and improvement of related filter trackers, algorithms such as CFLB and BACF have introduced spatial constraints in the training of filters to handle boundary effects, it makes the filter model more complex and the calculation speed slower, and the advantage of correlation filtering algorithms in computational speed is becoming increasingly unclear, although the algorithm solves the problem of boundary effects. To solve this problem, we introduced the alternating direction method of multipliers (ADMM) to solve the relevant filters. ADMM divides a large optimization problem into multiple subproblems that can be solved simultaneously in a distributed manner, and the approximate solution of the filter can be obtained quickly by iterating over the subproblems, thus greatly improving the computational efficiency.

Step S400: Iterating the target tracking model when the response value meets the preset confidence threshold until training is completed to obtain a trained target tracking model, and tracking the target in the video to be observed by using the trained target tracking model.

It should be noted that the preset confidence threshold mentioned above may be set by the administrator based on experience or updated after confirming experimental results, which is not limited by this embodiment. Satisfying the preset confidence level above can mean that the model is updated only when the part of the target frame in the current frame has a high confidence level (the target is not obscured or blurred).

In the specific implementation, when the response value meets the preset confidence threshold, the target tracking model is iteratively updated based on the current frame until the trained target tracking model is obtained after the target tracking is completed, and the above target tracking model is used to track the targets in the observed video.

It will be appreciated that, based on the shortcomings in the background art, the embodiment of the present invention proposes a target tracking method. The steps of the method include determining a target area based on the current frame of a training sample, extracting and fusing histogram of oriented gradient (HOG), color naming (CN), and color space HSV features of the target area to obtain a target template; determining a target function based on the target template and a spatial regularization weight factor; introducing the Sherman-Morrison formula into the alternating direction method of multipliers (ADMM) to accelerate the solution of the target function and obtain the response value; iterating the target tracking model when the response value meets the preset confidence threshold until training is completed to obtain a trained target tracking model, and tracking the target in the video to be observed by using the trained target tracking model. The present invention enhances the discriminability of feature response, improves the discrimination of targets, and enhances the stability of targets in deformation and light changes by extracting and fusing the features of histogram of oriented gradient (HOG), color naming (CN), and color space HSV in the target area, additionally, the present invention determines the target function through the spatial regularization based on the alternating direction method of multipliers (ADMM), so that while introducing the spatial regularization penalty boundary, the ADMM algorithm is used to reduce the iteration complexity, weaken the boundary effect, improve the operation efficiency of the algorithm, thus greatly improving the stability and tracking speed of the correlation filter tracking algorithm in target tracking.

In one possible embodiment, the step of determining the target function according to the target template and spatial regularization weight factor includes: The loss function after introducing weight factor θ is:

$$\psi_t(\omega) = \frac{1}{2}\sum_{t=1}^{t}\|f(x_i) - y_i\|^2 + \frac{1}{2}\sum_{j=1}^{d}\|\theta \odot \omega^j\|^2;$$

Where, $\odot$ is the dot product operation, $\psi_t$ is the training error of the classifier at the t-th frame, t is the sequence number of the current frame, i is the sequence number of the history frame, $x_i$ is the input sample of the i-th frame, $f(x_i)$ is the response score after the input sample of the i-th frame, $y_i$ is the expected response of the sample of the i-th frame, ω is the trained filter coefficient, j is the number of channels of the filter, d is the dimension of the classifier, and the regularization weight is defined as:

$$\theta(m,n) = \theta_{base} + \theta_{shift}(m,n);$$

Where, m,n represents the offset of cyclic samples, $\theta_{base}$ represents the basic weight of spatial regularization as a constant, and $\theta_{shift}$ represents the regularization weight offset of training samples;

$\theta_{shift}$ is defined as:

$$\theta_{shift}(m,n) = \theta_{width}\left(\frac{m}{\rho_{width}}\right)^2 + \theta_{height}\left(\frac{n}{\rho_{height}}\right)^2;$$

Where, m,n represents the offset of the cyclic sample, $\rho_{width}$ and $\rho_{height}$ represent the width and height of the search image, $\theta_{width}$ and $\theta_{height}$ represent the weight factors of the horizontal and vertical methods, respectively. The farther the training sample is from the target center, the greater the $\theta_{shift}$ value is, that is, the greater the regularization weight of the background area and the smaller the weight of the target area.

In the method of this embodiment, space regularization penalty boundary is introduced into the target tracking algorithm, and the corresponding regularization weight is set according to the position information of training samples and target space, thus the purpose of weakening the boundary effect is achieved.

In one possible embodiment, the steps of introducing the Sherman-Morrison formula into the alternating direction method of multipliers (ADMM) to accelerate the solution of the target function and obtain the response value include:

Step S301: Constructing auxiliary variable β and substituting the auxiliary variable β into the loss function of the filter to obtain the converted loss function;

Step S302: Performing Fourier transform of the loss function to obtain the corresponding frequency domain formula;

Step S303: Constructing an augmented Lagrange function based on the frequency domain formula, and introducing the Sherman-Morrison formula into the alternating direction method of multipliers (ADMM) to accelerate the solution of the Lagrange function and obtain the response value.

In the method of this embodiment, the iteration complexity is reduced and the operation efficiency of the target tracking algorithm is improved by introducing the Sherman-Morrison formula to accelerate the solution of the target function in the solution process of the target tracking algorithm.

In one possible embodiment, the steps of introducing Sherman-Morrison formula into the alternating direction method of multipliers (ADMM) to accelerate the solution of the Lagrange function include:

Step S3031: Using the alternating direction method of multipliers (ADMM) to decompose the augmented Lagrange function into multiple subproblems;

Step S3032: Decomposing each subproblem into preset multiple independent small targets based on the banded sparse matrix of the samples;

Step S3033: Accelerating the solution of each independent small target according to the Sherman-Morrison formula.

In the method of this embodiment, the iteration complexity is reduced and the operation efficiency of the target tracking algorithm is improved by introducing the Sherman-Morrison formula to accelerate the solution of the target function in the solution process of the target tracking algorithm.

In one possible embodiment, the process of accelerated solution of spatial regularization based on ADMM can be:

In the KCF correlation filtering algorithm, the classifier is trained with cyclic shift samples to obtain the optimal classifier under the minimum mean square error. The loss function in the training process is defined as $$\psi_t(\omega) = \sum_{i=1}^{t} \frac{1}{2}\|f(x_i) - y_i\|^2 + \frac{\lambda}{2}\sum_{j=1}^{d}\|\omega^j\|^2 \quad (3\text{-}1)$$

Where, $\psi_t$ is the training error of the classifier at the t-th frame, t is the sequence number of the current frame, i is the sequence number of the history frame, $x_i$ is the input sample of the i-th frame, $f(x_i)$ is the response score after the input sample of the i-th frame, $y_i$ is the expected response of the sample of the i-th frame, ω is the trained filter coefficient, j is the number of channels of the filter, $a_i$ is the classifier learning weight factor for the i-th frame, d is the dimension of the classifier, λ is the regularization factor to prevent over-fitting, which is a constant.

It can be seen from the above formula that the regularization factor λ is a constant. During the training process, it treats the samples in the background area as the same as the samples in the target area. However, in actual tracking, the target area is more weighted than the background area. Therefore, the regularization weight of the samples in the target area should be less than the regularization weight of the background part. For this reason, we introduce the spatial regularization weight factor θ and construct the spatial regularization correlation filter to weaken the interference of the background area and improve the classification ability of the classifier in the cluttered background. At the same time, we can also use this feature to expand the search area and solve the problem of target loss due to rapid movement.

After introducing the weight factor θ, the original formula can be changed to $$\operatorname*{argmin}_{\omega,\beta} \frac{1}{2}\sum_{i=1}^{t}\left\|\sum_{j=1}^{d} x_i^j * \beta^j - y_i\right\|^2 + \frac{1}{2}\sum_{j=1}^{d}\|\theta \odot \omega^j\|^2 \quad (3\text{-}2)$$

Where, $\odot$ is a dot product operation, and when $\theta = \sqrt{\lambda}$, equations (3-1) and (3-2) are the same. We define the regularization weight as $$\theta(m,n) = \theta_{base} + \theta_{shift}(m,n) \quad (3\text{-}3)$$

Where, m,n represents the offset of the cyclic sample, and $\theta_{base}$ represents the basic weight of spatial regularization, which is a constant, $\theta_{shift}$ represents the regularization weight offset of training samples, and $\theta_{shift}$ is defined as $$\theta_{shift}(m,n) = \theta_{width}\left(\frac{m}{\rho_{width}}\right)^2 + \theta_{height}\left(\frac{n}{\rho_{height}}\right)^2 \quad (3\text{-}4)$$

Where, $\rho_{width}$ and $\rho_{height}$ represent the width and height of the search image, while $\theta_{width}$ and $\theta_{height}$ represent the weight factors in the horizontal and vertical directions, respectively. It can be seen from Formula (3-4) that the farther the training sample is from the target center, the greater the value of $\theta_{shift}$, that is, the greater the regularization weight of the background area, and the smaller the weight of the target area.

The next main task, like the KCF tracker, is to solve the filter coefficient ω, which is the core problem in related filtering algorithms. With the continuous research and improvement of related filter trackers, algorithms such as CFLB and BACF have introduced spatial constraints in the training of filters to handle boundary effects, it makes the filter model more complex and the calculation speed slower, and the advantage of correlation filtering algorithms in computational speed is becoming increasingly unclear, although the algorithm solves the problem of boundary effects.

To solve this problem, we introduced the alternating direction method of multipliers (ADMM) to solve the relevant filters. ADMM divides a large optimization problem into multiple subproblems that can be solved simultaneously in a distributed manner, and the approximate solution of the filter can be obtained quickly by iterating over the subproblems.

The ADMM algorithm is typically used to solve minimization problems in the following forms:

$$\operatorname*{argmin}_{x,y} f(x) + g(y) \quad (3\text{-}5)$$
$$\text{s.t. } Ax + By = c$$

The augmented Lagrangian function for this problem is defined as $$L(x, y, \varsigma) = f(x) + g(y) + \varsigma^T(Ax + By - c) + \frac{\mu}{2}\|Ax + By - c\|_2^2 \quad (3\text{-}6)$$

The classic ADMM algorithm framework is as follows:
Initialize $y^0$, $\varsigma^0$, $\mu > 0$, and set $k > 0$;
The iteration steps are:

$$\varsigma^{k+1} := \varsigma^k + \mu(Ax^{k+1} + By^{k+1} - c) \quad (3\text{-}7)$$

If the termination condition is met, stop the iteration and output the result. Otherwise, return to continue the iteration.

Therefore, we can transform equation (3-2) into the form of an augmented Lagrangian function. Since ADMM iteration requires two variables, we construct auxiliary variable β and let β=ω.

Then Equation (3-2) is converted to $$\operatorname*{argmin}_{\omega,\beta} \frac{1}{2}\sum_{i=1}^{t}\left\|\sum_{j=1}^{d} x_i^j * \beta^j - y_i\right\|^2 + \frac{1}{2}\sum_{j=1}^{d}\|\theta \square \omega^j\|^2 \quad (3\text{-}8)$$
$$\text{s.t. } \beta = \omega$$

Convert it to the frequency domain to obtain $$\operatorname*{argmin}_{\omega,\beta} = \frac{1}{2}\|\hat{y} - \hat{X}\hat{\beta}\|_2^2 + \frac{1}{2}\|\theta\omega\|_2^2 \quad (3\text{-}9)$$
$$\text{s.t. } \hat{\beta} = \sqrt{t}F\omega$$

Where, ^ represents the Fourier transform of the variable, the discrete Fourier transform of a one-dimensional signal a is represented as $\hat{a}=\sqrt{t}Fa$, wherein, F is the orthogonal Fourier transform matrix of size t×t, $\hat{y}=[\hat{y}(1), \hat{y}(2), \ldots, \hat{y}(t)]$, $\hat{X}=[\operatorname{diag}(\hat{x}_1)^T, \ldots, \operatorname{diag}(\hat{x}_d)^T]$, in size t×dt, which is a matrix composed of multi-channel cyclic samples, $\hat{\beta}=[\hat{\beta}_1^T, \ldots, \hat{\beta}_d^T]$, h=$[h_1^T, \ldots, h_d^T]$, in size dt×1.

The augmented Lagrangian expression is:

$$L(\omega, \hat{\beta}, \hat{\varsigma}) = \frac{1}{2}\|\hat{y} - \hat{X}\hat{\beta}\|_2^2 + \frac{1}{2}\|\theta\omega\|_2^2 + \hat{\varsigma}^T(\hat{\beta} - \sqrt{t}F\omega) + \frac{\mu}{2}\|\hat{\beta} - \sqrt{t}F\omega\|_2^2 \quad (3\text{-}10)$$

Where, μ is the penalty factor and $\hat{\varsigma} = [\hat{\varsigma}_1^T, \ldots, \hat{\varsigma}_K^T]^T$ is the Lagrangian vector in the Fourier domain of size dt×1. We can iteratively solve the above equation using the ADMM algorithm according to formula (3-7), and each subproblem ω and $\hat{\beta}$ have a closed form solution.

For subproblem $\hat{\beta}$:

$$\hat{\beta} = \operatorname*{argmin}_{\hat{\beta}} \frac{1}{2}\|\hat{y} - \hat{X}\hat{\beta}\|_2^2 + \hat{\varsigma}^T(\hat{\beta} - \sqrt{t}F\omega) + \frac{\mu}{2}\|\hat{\beta} - \sqrt{t}F\omega\|_2^2 \quad (3\text{-}12)$$

The complexity of directly solving this equation is $O(t^3d^3)$, because every ADMM iteration requires solving $\hat{\beta}$, which greatly affects the real-time performance of the algorithm. However, sample $\hat{X}$ is a banded sparse matrix, so each element in $\hat{y}(s)=[\hat{y}(1), \hat{y}(2), \ldots, \hat{y}(t))]^T$, is only related to k in $\hat{x}(s)=[\hat{x}_1(t), \ldots, \hat{x}_k(t)]^T$ and $\hat{\beta}(s)=[\operatorname{conj}(\hat{\beta}_1(t)), \ldots, \operatorname{conj}(\hat{\beta}_k(t))]^T$, and operator conj applies complex conjugate to complex vectors. Therefore, $\hat{\beta}$ in the above equation can be equivalent to t independent small targets $\hat{\beta}(s)$, s=[1, ..., t].

$$\hat{\beta}(s) = \quad (3\text{-}13)$$
$$\operatorname*{argmin}_{\hat{\beta}(s)}\left\{\frac{1}{2}\|\hat{y}(s) - \hat{x}(s)^T\hat{\beta}(s)\|_2^2 + \hat{\varsigma}(s)^T(\hat{\beta}(s) - \hat{\omega}(s)) + \frac{\mu}{2}\|\hat{\beta}(s) - \hat{\omega}(s)\|_2^2\right\}$$

Where, $\hat{\omega}(s)=[\hat{\omega}_1(s), \ldots, \hat{\omega}_k(s)]$ and $\hat{\omega}_k=\sqrt{t}F\omega_k$ are solved as follows $$\hat{\beta}(s) = \frac{\hat{y}(s)\hat{x}(s) - t\hat{\varsigma}(s) + \mu t\hat{\omega}(s)}{\hat{x}(s)\hat{x}(s)^T + \mu t I_k} \quad (3\text{-}14)$$

The computational complexity of formula (3-13) is $O(td^3)$. This process still needs to deal with t independent linear system of K×K. Here, because the variables on the denominator are all d-dimensional, we introduce the Sherman-Morrison formula $((uv^T+A)^{-1}=A^{-1}-(v^TA^{-1}u)^{-1}A^{-1}uv^TA^{-1})$ to accelerate the operation. We set $A=\mu t I_k$ and $u=v=\hat{x}(s)$. The original formula can be simplified as $$\hat{\beta}(s) = \frac{1}{\mu}(t\hat{y}(s)\hat{x}(s) - \hat{\varsigma}(s) + \mu\hat{\omega}(s)) - \frac{\hat{x}(s)}{\mu b}(t\hat{y}(s)\hat{S}_x(s) - \hat{S}_\varsigma(s) + \mu\hat{S}_\omega(s)) \quad (3\text{-}15)$$

Where, $\hat{S}_x(s)=\hat{x}(s)^T\hat{x}$, $\hat{S}_\varsigma(s)=\hat{x}(s)^T\hat{\varsigma}$, $\hat{S}_\omega(s)=\hat{x}(s)^T\hat{\omega}$, $b=\hat{S}_x(s)+\mu t$. At this point, the computational complexity of the formula decreases to $O(td)$.

Iterative update:

$$\hat{\varsigma}^{k+1} := \hat{\varsigma}^k + \mu(\hat{\beta}^{k+1} - \hat{\omega}^{k+1}) \quad (3\text{-}16)$$

Where $\hat{\beta}^{k+1}$ and $\hat{\omega}^{k+1}$ represent the current solution of the above subproblem by iterating step k+1 in ADMM. $\hat{\omega}^{k+1} = \sqrt{t}F\hat{\omega}^{k+1}$, $\mu^{k+1} = \min(\mu_{max}, \alpha\mu^k)$.

In this embodiment, the alternating direction method of multipliers (ADMM) and Sherman-Morrison formula are used to simplify the computational complexity and greatly improve the solving speed of target tracking algorithm.

In one possible embodiment, the steps of scale adaptation also include:

Step S001: Constructing a scale pool based on the size of the template for the current frame in the training sample;

Step S002: Performing sliding sampling on the next frame image in the training sample based on different scales in the scale pool to obtain samples of different scales;

Step S003: Calculating the response values of samples at each scale based on the preset scale filter to obtain the samples at the scale with the highest response value;

Step S001: The sample with the largest scale of the response value is adjusted to the same dimension as the template of the current frame by the bilinear interpolation to obtain the candidate region of the image of the next frame in the training sample.

Figure 4:
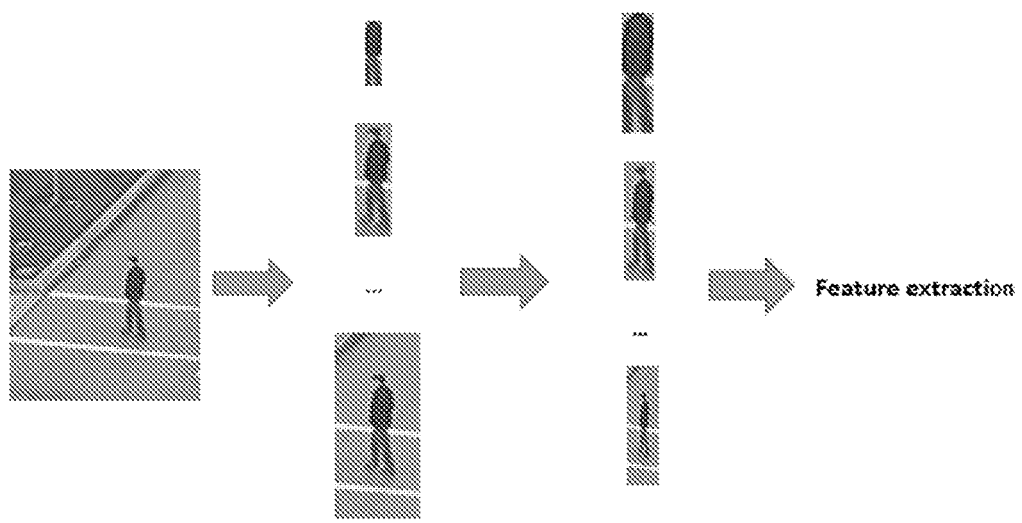
FIG. 4 shows a schematic diagram of the process of obtaining candidate regions of different scales based on the scale pool provided by the present invention.

Refer to FIG. 4, which shows a schematic diagram of the process of obtaining candidate regions of different scales based on the scale pool provided by the present invention. For most tracking methods, the template size of the target is fixed. To handle scale changes, we propose expanding the scale space from countable integer space to uncountable floating-point space. Assuming that the size of the template in the original image is $s_k$, we define d different scales to form a scale pool $S=\{d_1 s_k, d_2 s_k, \ldots, d_d s_k\}$. When tracking, we take d image blocks of different scales in the image of a new frame according to S, and then adjust these image blocks to the same dimensions as the initial frame template $s_k$ through bilinear interpolation.

Figure 5:
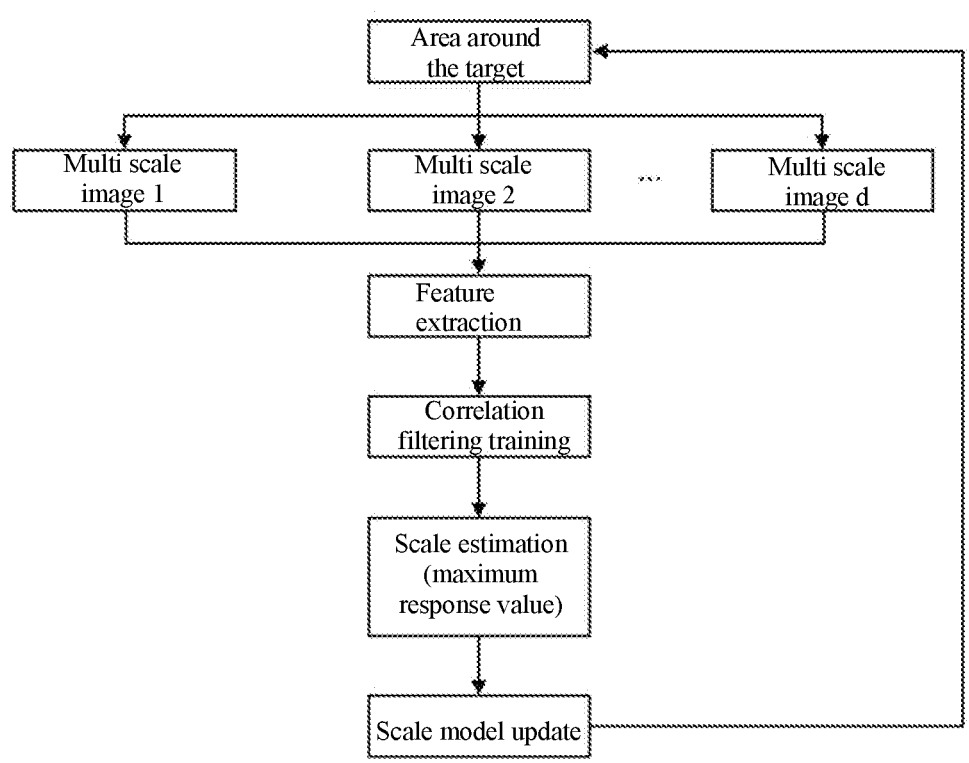
FIG. 5 shows a schematic diagram of the scale model training process provided by the present invention.

Refer to FIG. 5, which shows a schematic diagram of the scale model training process provided by the present invention. In the tracking algorithm of the present invention, a scale filter can also be specifically trained to estimate the scale of the target. The specific training process is similar to that of the KCF tracker, and the scale of the new frame of the target is based on the scale value with the maximum response in the input scale pool.

In the implementation example of the present invention, by adding an adaptive scale pool to the target tracking algorithm, a scale pool containing 7 scale sizes is proposed, which enables the target tracking algorithm to adapt well to changes in scale. This solves the problem of the previous target scale being unable to adaptively adjust according to the target size, which affects tracking accuracy. During the target tracking process, when the target scale is reduced, it causes a large amount of background information to be included in the selected image block; when the target scale is expanded, it will cause the selected image block to only contain local information of the target, improving the adaptability of the target tracking algorithm.

In one possible embodiment, the steps of iterating a target tracking model when the response value meets a preset confidence threshold include:

Step S401: Obtaining the correlation peak mean difference ratio (CPMDR) based on the distribution map corresponding to the response values;

Step S402: Obtaining a model update rate based on the correlation peak mean difference ratio (CPMDR), and updating the target model based on the model update rate.

In the current existing target tracking algorithms, the model is almost updated every frame, without considering the accuracy of target detection. If the new tracking results are not accurate, the obtained results will still update the model, which will contaminate the model and cause target tracking drift. Therefore, the embodiment of the invention proposes to update the model only when the part in the target frame of the current frame has high confidence (the target is not occluded or blurred), so that the model update strategy based on high confidence can not only solve the problem of model contamination, improve the robustness of the tracking algorithm to occlusion and other problems, but also improve the tracking speed and prevent over-fitting.

From a large number of experiments on KCF, it can be found that when accurately tracking, the response distribution graph of KCF has and only has a very obvious peak, and its overall distribution is approximately a two-dimensional Gaussian distribution. However, when complex situations occur during the tracking process (especially occlusion, loss, blurring, etc.), the response graph will experience severe oscillations. The peak and fluctuation of the response graph can reflect the confidence level of the tracking results to a certain extent. When the detected target matches the correct target very well, the ideal response graph should only have one peak, and other areas will tend to be smooth. The higher the correlation peak, the better the positioning accuracy. If the positioning is not accurate enough, the response graph will oscillate violently, and its shape will differ significantly from the shape when correctly matched. Based on this, we adopt a judgment formula, the correlation peak mean difference ratio (CPMDR):

$$CPMDR = |f_{max} - f_{min}|^2 \frac{MN}{\sum_{m=0}^{M}\sum_{n=0}^{N}(f_{m,n} - f_{min})^2};$$

Where, $f_{max}$ represents the maximum value in the response graph, $f_{min}$ represents the minimum value in the response graph, $f_{m,n}$ represents the value at (m,n) in the response graph, and M, N represent the peak value.

The correlation peak mean difference ratio (CPMDR) can reflect the fluctuation of the response graph. When it is less than a certain threshold, it can be determined that the target was lost, obstructed or left the field of view during the target tracking process. In traditional KCF tracking, a simple model update method is used:

$$\hat{x}_{model}^{(f)} = (1-\eta)\hat{x}_{model}^{(f-1)} + \eta\hat{x}_{model}^{(f)};$$

Where, $\eta$ is the model update rate. According to this method, each frame of the classifier needs to be updated, and once the tracking fails, it cannot continue tracking. To solve this problem, we use an update strategy of a high confidence model with adaptive learning rate. To prevent model contamination, when the target area is obstructed, the target model should not be updated again. It can only be updated when the CPMDR value exceeds a certain threshold. We set the model update rate to be positively correlated with the CPMDR value. Let $$\eta = \eta_1\left(1 - \frac{1}{CPMDR}\right).$$

If we set $\eta_1$ to 0.02, the adaptive update model is:

$$\hat{x}_{model}^{(f)} = \begin{cases} (1-\eta)\hat{x}_{model}^{(f-1)} + \eta\hat{x}_{model}^{(f)}, & \eta > \text{threshold} \\ \hat{x}_{model}^{(f-1)}, & \text{else} \end{cases};$$

We use this updated model to calculate $\hat{\beta}(s)$, $\hat{S}_x(s)$, $\hat{S}_{\tilde{z}}(s)$ and $\hat{S}_\omega(s)$.

According to experimental measurements, when the CPMDR value is greater than 50, it can be considered as accurate tracking, so we set the threshold to 0.0196.

Figure 6:
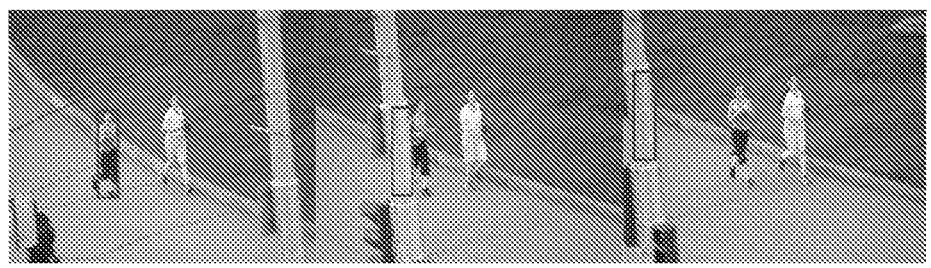
FIG. 6 shows the tracking effect of the basic KFC algorithm.
Figure 7:
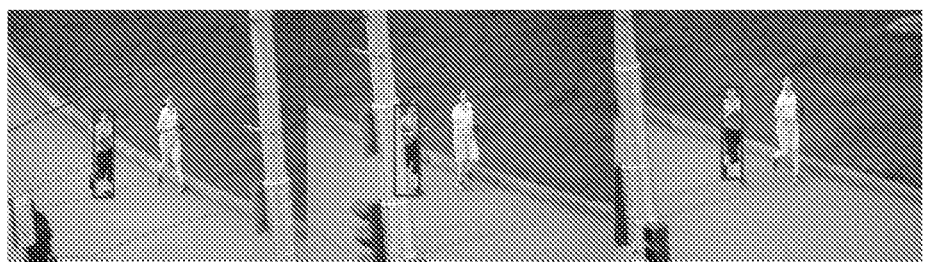
FIG. 7 shows the tracking effect of the KCF algorithm provided by the present invention with a high confidence model update strategy added.

Referring to FIGS. 6 and 7, it is evident from the comparison of two sets of images that the KCF algorithm with a high confidence model update strategy is superior to the basic KCF algorithm. This is because the improved KCF algorithm did not update the model when it was occluded, so the model was not contaminated. After the target reappeared, the algorithm retraced to the target.

Figure 8A:
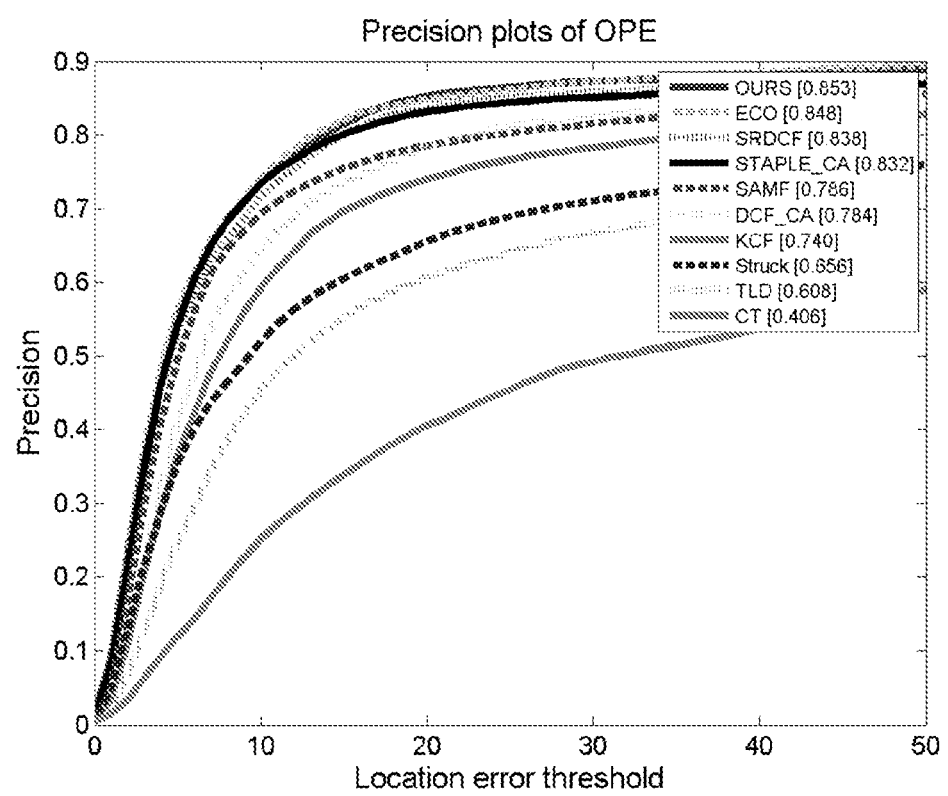
FIG. 8a shows a schematic diagram of the success rate of distance error provided by the present invention.
Figure 8B:
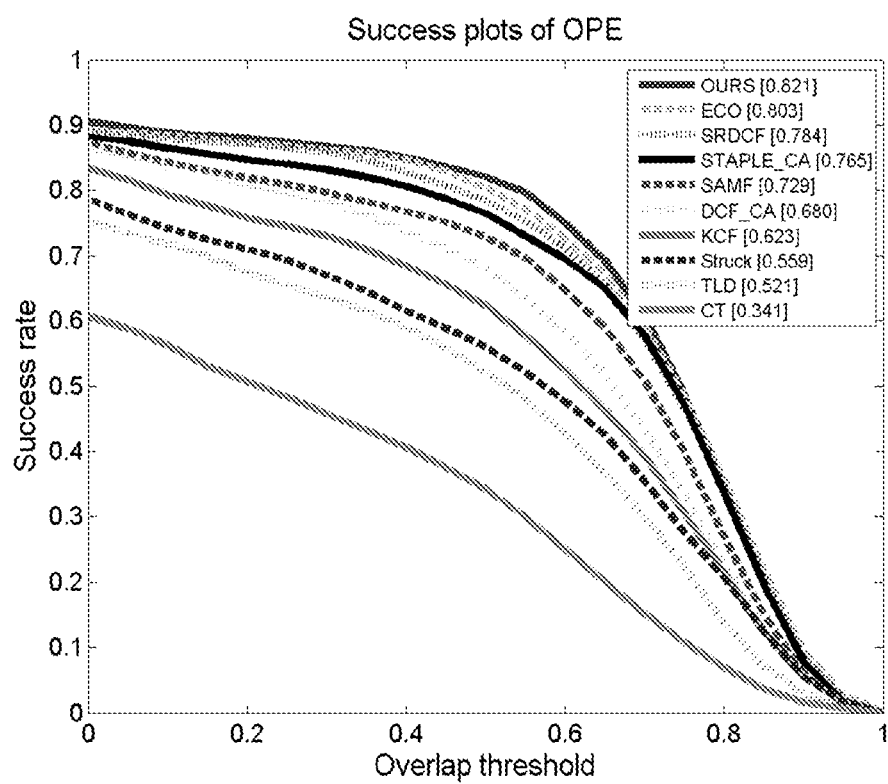
FIG. 8b shows a schematic diagram of the success rate of the coincidence degree provided by the present invention.

Refer to FIG. 8a and FIG. 8b for a comparison of the success rates of different algorithms in tracking the OTB-50 dataset. The red line shows the results of our algorithm testing, where FIG. (a) shows the success rate of distance error and FIG. (b) shows the success rate of coincidence. It can be clearly seen that our algorithm not only improves the tracking accuracy, but also accelerates the calculation speed. Experimental data shows that our algorithm has higher tracking accuracy and robustness.

In the embodiment of the present invention, the use of correlation peak mean difference ratio (CPMDR) to determine the occlusion state achieves adaptive updating of the model, addresses the model pollution problem caused by target occlusion, and improves the stability of the algorithm.

Figure 9:
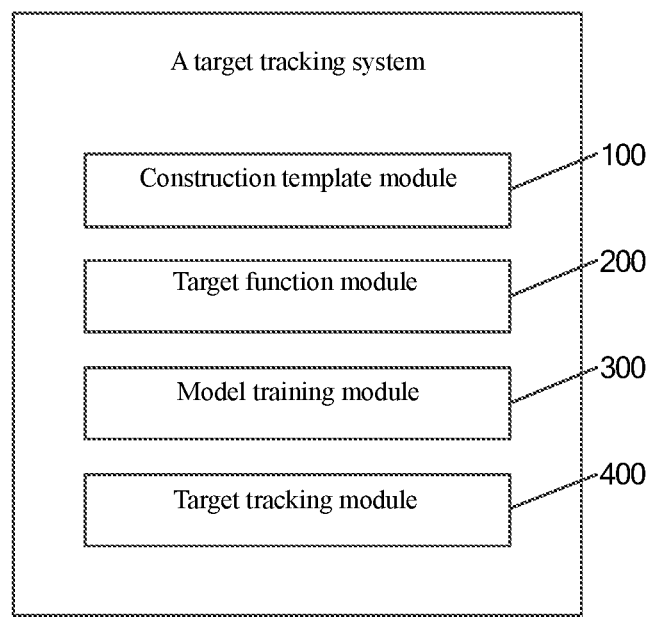
FIG. 9 shows a schematic diagram of the structure of a target tracking system provided by the present invention.

FIG. 9 shows a schematic diagram of the structure of a target tracking system provided by an embodiment of the present invention, as shown in it, a target tracking system comprises a construction template module 100, a target function module 200, a model training module 300, and a target tracking module 400, wherein:

A construction template module 100, for determining a target area based on the current frame of a training sample, extracting and fusing histogram of oriented gradient (HOG), color naming (CN), and color space HSV features of the target area to obtain a target template; a target function module 200, for determining a target function based on the target template and a spatial regularization weight factor; a model training module 300, for introducing the Sherman-Morrison formula into the alternating direction method of multipliers (ADMM) to accelerate the solution of the target function and obtain the response value; and a target tracking module 400, for iterating the target tracking model when the response value meets the preset confidence threshold until training is completed to obtain a trained target tracking model, and tracking the target in the video to be observed by using the trained target tracking model.

It will be appreciated that the target tracking system provided by the present invention corresponds to the target tracking methods provided in the aforementioned embodiments. The relevant technical features of the target tracking system can refer to the relevant technical features of the target tracking method, and will not be repeated herein.

Figure 10:
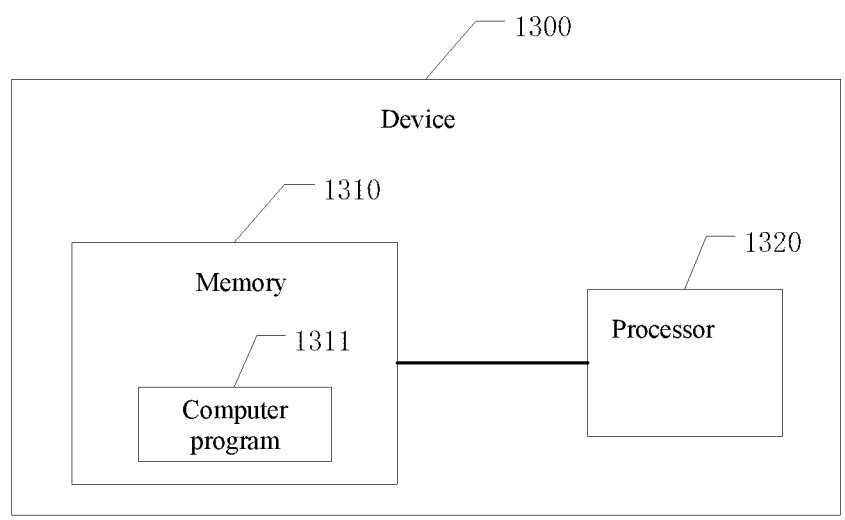
FIG. 10 show a schematic diagram of the hardware structure of a possible device provided by the present invention.

Please refer to FIG. 10, which shows an exemplary embodiment of a device provided by the present invention. As shown in FIG. 10, an embodiment of the present invention provides an electronic device, comprising a memory 1310, a processor 1320, and a computer program 1311 stored on the memory 1310 and capable of running on the processor 1320. When the processor 1320 executes the computer program 1311, the following steps are implemented:

Determining a target area based on the current frame of a training sample, extracting and fusing histogram of oriented gradient (HOG), color naming (CN), and color space HSV features of the target area to obtain a target template; determining a target function based on the target template and a spatial regularization weight factor; introducing the Sherman-Morrison formula into the alternating direction method of multipliers (ADMM) to accelerate the solution of the target function and obtain the response value; iterating the target tracking model when the response value meets the preset confidence threshold until training is completed to obtain a trained target tracking model, and tracking the target in the video to be observed by using the trained target tracking model.

Figure 11:
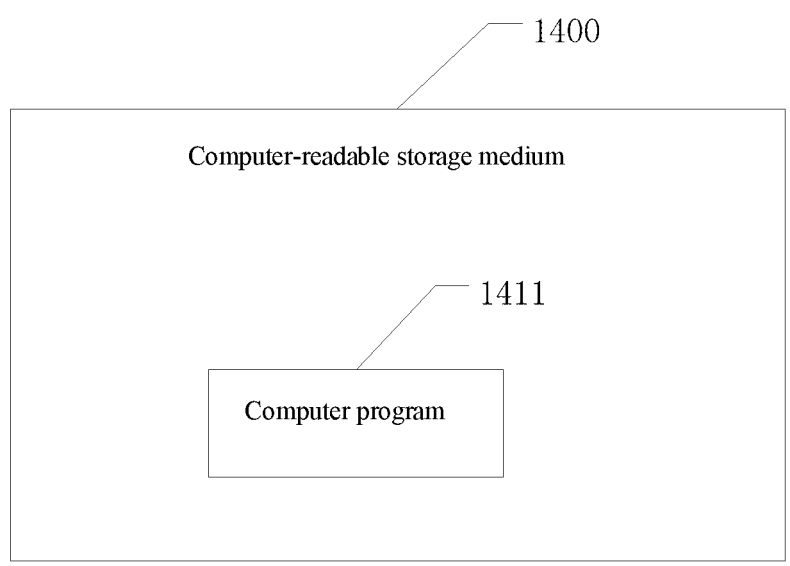
FIG. 11 show a schematic diagram of the hardware structure of a possible computer-readable storage medium provided by the present invention.

Please refer to FIG. 11, which shows an exemplary embodiment of a computer-readable storage medium provided by the present invention. As shown in FIG. 11, this embodiment provides a computer readable storage medium 1400, on which a computer program 1411 is stored. When the computer program 1411 is executed by the processor, the following steps are implemented:

Determining a target area based on the current frame of a training sample, extracting and fusing histogram of oriented gradient (HOG), color naming (CN), and color space HSV features of the target area to obtain a target template; determining a target function based on the target template and a spatial regularization weight factor; introducing the Sherman-Morrison formula into the alternating direction method of multipliers (ADMM) to accelerate the solution of the target function and obtain the response value; iterating the target tracking model when the response value meets the preset confidence threshold until training is completed to obtain a trained target tracking model, and tracking the target in the video to be observed by using the trained target tracking model.

The present invention provides a target tracking method, system, electronic device and storage medium, wherein the steps of the method include determining a target area based on the current frame of a training sample, extracting and fusing histogram of oriented gradient (HOG), color naming (CN), and color space HSV features of the target area to obtain a target template; determining a target function based on the target template and a spatial regularization weight factor; introducing the Sherman-Morrison formula into the alternating direction method of multipliers (ADMM) to accelerate the solution of the target function and obtain the response value; iterating the target tracking model when the response value meets the preset confidence threshold until training is completed to obtain a trained target tracking model, and tracking the target in the video to be observed by using the trained target tracking model. The present invention enhances the discriminability of feature response, improves the discrimination of targets, and enhances the stability of targets in deformation and light changes by extracting and fusing the features of histogram of oriented gradient (HOG), color naming (CN), and color space HSV in the target area, additionally, the present invention determines the target function through the spatial regularization based on the alternating direction method of multipliers (ADMM), so that while introducing the spatial regularization penalty boundary, the ADMM algorithm is used to reduce the iteration complexity, weaken the boundary effect, improve the operation efficiency of the algorithm, thus greatly improving the stability and tracking speed of the correlation filter tracking algorithm in target tracking.

It should be noted that in the above embodiments, the descriptions of each embodiment have their own emphasis. For the parts that are not described in detail in one embodiment, please refer to the relevant descriptions of other embodiments.

Those skilled in the art should understand that embodiments of the present invention can be provided as methods, systems, or computer program products. Therefore, the present invention may be in the form of an entirely hardware embodiment, an entirely software embodiment, or an embodiment combining software and hardware aspects. Moreover, the present invention may be in the form of a computer program product implemented on one or more computer available storage media (including but not limited to disk storage, CD-ROM, optical storage, etc.) containing computer available program code.

The present invention is described with reference to the flowchart and/or block diagram of the method, device (system), and computer program product according to the embodiments of the present invention. It should be understood that each process and/or box in a flowchart and/or block diagram can be implemented by computer program instructions, as well as the combination of processes and/or boxes in the flowchart and/or block diagram. These computer program instructions can be provided to processors of general-purpose computers, specialized computers, embedded computers, or other programmable data processing devices to generate a machine that generates instructions executed by processors of computers or other programmable data processing devices for implementing functions specified in a flowchart or multiple flows and/or a block diagram or multiple boxes.

These computer program instructions can also be stored in computer readable memory that can guide a computer or other programmable data processing device to work in a specific way, causing the instructions stored in the computer readable memory to generate a manufacturing product including instruction devices, which implement the functions specified in one or more processes and/or blocks of a flowchart.

These computer program instructions can also be loaded onto a computer or other programmable data processing device to perform a series of operational steps on the computer or other programmable device to generate computer-implemented processing. The instructions executed on the computer or other programmable device provide steps for implementing the functions specified in a flowchart or multiple processes and/or a block diagram or multiple boxes.

Although preferred embodiments of the present invention have been described, those skilled in the art may make additional changes and modifications to these embodiments once they have knowledge of the basic creative concepts. Therefore, the attached claims are intended to be interpreted as including preferred embodiments and all changes and modifications falling within the scope of the present invention.

Obviously, technicians in this field can make various modifications and variations to the present invention without departing from the spirit and scope of the present invention. In this way, if these modifications and variations of the present invention fall within the scope of the claims and their equivalents, the present invention is also intended to include these modifications and variations.

What is claimed is:

1. A target tracking method, the method comprises:

determining a target area based on a current frame of a training sample in a video, extracting and fusing histogram of oriented gradient (HOG), color naming (CN), and color space HSV features of the target area to obtain a target template;

determining a target function according to the target template and a spatial regularization weight factor;

introducing the Sherman-Morrison formula into an alternating direction method of multipliers (ADMM) to accelerate solving the target function and obtain a response value;

iterating the target tracking model until the response value meets a preset confidence threshold to complete training to obtain a trained target tracking model, and tracking the target in the video to be observed by using the trained target tracking model;

wherein the steps of introducing the Sherman-Morrison formula into the alternating direction method of multipliers (ADMM) to accelerate solving the target function and obtain the response value comprises:

constructing an auxiliary variable and substituting the auxiliary variable into a loss function of a filter to obtain a converted loss function, wherein, the auxiliary variable is substituted into the loss function of the filter to obtain the converted loss function as:

$$\operatorname*{argmin}_{\omega,\beta} \frac{1}{2}\sum_{i=1}^{t}\left\|\sum_{j=1}^{d} x_i^j * \beta^j - y_i\right\|^2 + \frac{1}{2}\sum_{j=1}^{d}\left\|\theta \odot \omega^j\right\|^2$$

such that $\beta = \omega$ wherein $\odot$ is a dot product operation, $\omega$ is the trained filter coefficient, $\beta$ is the auxiliary variable, t represents the sequence number of the current frame, i represents the sequence number of the historical frame, d is the dimension of the classifier, j is the number of channels for the filter, $x_i$ is the input sample of the i-th frame, $y_i$ represents the expected response of the sample of the i-th frame, and $\theta$ is the weight factor;

Fourier transform the loss function to obtain a corresponding frequency domain formula, wherein, the corresponding frequency domain formula obtained by Fourier transformation of the loss function is:

$$\arg\min_{\omega,\beta} \frac{1}{2}\|\hat{y} - \hat{X}\hat{\beta}\|_2^2 + \frac{1}{2}\|\theta\omega\|_2^2 \text{ such that } \hat{\beta} = \sqrt{t}F\omega$$

wherein ^ represents the Fourier transform of the variable, $\omega$ is the trained filter coefficient, $\beta$ is the auxiliary variable, $\theta$ is the weight factor, the discrete Fourier transform of a one-dimensional signal a is represented as $\hat{a}=\sqrt{t}Fa$, wherein, F is the orthogonal Fourier transform matrix of size t×t, $\hat{y}=\tilde{y}=[\hat{y}(1), \hat{y}(2), \ldots, \hat{y}(t)]$, $\hat{X}=[\operatorname{diag}(\hat{x}_1)^T, \ldots, \operatorname{diag}(\hat{x}_d)^T]$, in size t×dt, which is a matrix composed of multi-channel cyclic samples, $\hat{\beta}=[\hat{\beta}_1^T, \ldots, \hat{\beta}_d^T]$, in size dt×1;

constructing an augmented Lagrange function based on the corresponding frequency domain formula, and introducing the Sherman-Morrison formula into the alternating direction method of multipliers (ADMM) to accelerate the solving the Lagrange function and obtain the response value; wherein, the augmented Lagrangian function constructed based on the corresponding frequency domain formula is:

$$L(\hat{\omega}, \hat{\beta}, \hat{\varsigma}) = \frac{1}{2}\|\hat{y} - \hat{X}\hat{\beta}\|_2^2 + \frac{1}{2}\|\theta\omega\|_2^2 + \hat{\varsigma}^T(\hat{\beta} - \sqrt{t}F\omega) + \frac{\mu}{2}\|\hat{\beta} - \sqrt{t}F\omega\|_2^2$$

wherein μ is the penalty factor, $\hat{\varsigma} = [\hat{\varsigma}_1^T, \ldots, \hat{\varsigma}_K^T]^T$ is the Lagrangian vector in the Fourier domain of size dt×1, ^ represents the Fourier transform of the variable, ω is the trained filter coefficient, β is the auxiliary variable, θ is the weight factor, the discrete Fourier transform of a one-dimensional signal a is represented as $\hat{a} = \sqrt{t}Fa$, wherein, F is the orthogonal Fourer transform matrix of size t×t, $\hat{y} = [\hat{y}(1), \hat{y}(2), \ldots, \hat{y}(t)]$, $\hat{X} = [\text{diag}(\hat{x}_1)^T, \ldots, \text{diag}(\hat{x}_d)^T]$, in size t×dt, wherein the steps of introducing Sherman-Morrison formula into the alternating direction method of multipliers (ADMM) to accelerate solving the Lagrange function comprises:

using the alternating direction method of multipliers (ADMM) to decompose the augmented Lagrange function into multiple subproblems; wherein the alternating direction method of multipliers (ADMM) is used to decompose the augmented Lagrange function into multiple subproblems:

$$\hat{\beta} = \arg\min_{\hat{\beta}(s)} \frac{1}{2}\|\hat{y} - \hat{X}\hat{\beta}\|_2^2 + \hat{\varsigma}^T(\hat{\beta} - \sqrt{t}F\omega) + \frac{\mu}{2}\|\hat{\beta} - \sqrt{t}F\omega\|_2^2$$

where μ is the penalty factor, $\hat{\varsigma} = [\hat{\varsigma}_1^T, \ldots, \hat{\varsigma}_K^T]^T$ is the Lagrangian vector in the Fourier domain of size dt×1, ^ represents the Fourier transform of the variable, ω is the trained filter coefficient, β is the auxiliary variable, θ is the weight factor, the discrete Fourier transform of a one-dimensional signal a is represented as $\hat{a} = \sqrt{t}Fa$, wherein, F is the orthogonal Fourer transform matrix of size t×t, $\hat{y} = [\hat{y}(1), \hat{y}(2), \ldots, \hat{y}(t)]$, $\hat{X} = [\text{diag}(\hat{x}_1)^T, \ldots, \text{diag}(\hat{x}_d)^T]$, in size t×dt, which is a matrix composed of multi-channel cyclic samples, $\hat{\beta} = [\hat{\beta}_1^T, \ldots, \hat{\beta}_d^T]$, in size dt×1; sample $\hat{X}$ is a banded sparse matrix, so each element in $\hat{y}(s) = [\hat{y}(1), \hat{y}(2), \ldots, \hat{y}(t)]$ is only related to k in $\hat{x}(s) = [\hat{x}_1(t), \ldots, \hat{x}_k(t)]^T$ and $\hat{\beta}(s) = [\text{conj}(\hat{\beta}_1(t)), \ldots, \text{conj}(\hat{\beta}_k(t))]^T$, operator conj applies complex conjugate to complex vectors; therefore, $\hat{\beta}$ in the above equation can be equivalent to t independent small targets $\hat{\beta}(s)$, s=[1, ..., t];

decomposing each subproblem into preset multiple independent small targets based on the banded sparse matrix of the samples, wherein, each subproblem is decomposed into preset independent small targets based on the banded sparse matrix of samples:

$$\hat{\beta}(s) = \arg\min_{\hat{\beta}(s)} \frac{1}{2}\|\hat{y}(s) - \hat{x}(s)^T\hat{\beta}(s)\|_2^2 + \hat{\varsigma}(s)^T(\hat{\beta} - \omega(s)) + \frac{\mu}{2}\|\hat{\beta}(s) - \hat{\omega}(s)\|_2^2;$$

where, $\hat{\omega}(s) = [\hat{\omega}_1(s), \ldots, \hat{\omega}_k(s)]$ and $\hat{\omega} = \sqrt{t}F\omega_k$, are solved as follows:

$$\hat{\beta}(s) = \frac{\hat{y}(s)\hat{x}(s) - t\hat{\varsigma}(s) + \mu t\hat{\omega}(s)}{\hat{x}(s)\hat{x}(s)^T + \mu t I_k}$$

accelerating a solution of each independent small target according to the Sherman-Morrison, wherein the solution is accelerated for each independent small target according to the Sherman-Morrison formula:

$$\hat{\beta}(s) = \frac{1}{\mu}(t\hat{y}(s)\hat{x}(s) - \hat{\varsigma}(s) + \mu\hat{\omega}(s)) - \frac{\hat{x}(s)}{\mu b}(t\hat{y}(s)\hat{S}_x(s) - \hat{S}_\varsigma(s) + \mu\hat{S}_\omega(s))$$

where $\widehat{S_x}(s) = \hat{x}(s)^T\hat{x}$, $\hat{S}_{\varsigma(s) = \hat{x}(s)}^T\varsigma$, $\widehat{S_\omega}(s) = \hat{x}(s)^T\hat{\omega}$, $b = \widehat{S_x}(s) + \mu t$.

2. The target tracking method of claim 1, wherein determining the target function according to the target template and spatial regularization weight factor comprises:

the loss function after introducing weight factor θ is:

$$\psi_t(\omega) = \frac{1}{2}\sum_{i=1}^{t}\|f(x_i) - y_i\|^2 + \frac{1}{2}\sum_{j=1}^{d}\|\theta \odot \omega^j\|^2$$

where, $\odot$ is the dot product operation, $\psi_t$ is the training error of the classifier at the t-th frame, t is the sequence number of the current frame, i is the sequence number of the history frame, $x_i$ is the input sample of the i-th frame, $f(x_i)$ is the response score after the input sample of the i-th frame, $y_i$ is the expected response of the sample of the i-th frame, ω is the trained filter coefficient, j is the number of channels of the filter, d is the dimension of the classifier, and the regularization weight is defined as:

$$\theta(m,n) = \theta_{base} + \theta_{shift}(m,n)$$

where, m and n represents the offset of cyclic samples, $\theta_{base}$ represents the basic weight of spatial regularization as a constant, and $\theta_{shift}$ represents the regularization weight offset of training samples;

$\theta_{shift}$ is defined as:

$$\theta_{shift}(m, n) = \theta_{width}\left(\frac{m}{\rho_{width}}\right)^2 + \theta_{height}\left(\frac{n}{\rho_{height}}\right)^2$$

where, m and n represents the offset of cyclic samples, $\rho_{width}$ and $\rho_{height}$ represent the width and height of the search image, $\theta_{width}$ and $\theta_{height}$ represent the weight factors of the horizontal and vertical methods, respectively;

the farther the training sample is from the target center, the greater the $\theta_{shift}$ value is the greater the regularization weight of the background area and the smaller the weight of the target area.

3. The target tracking method of claim 1, wherein the steps of scale adaptation comprises:

constructing a scale pool based on the size of the template for the current frame in the training sample;

performing sliding sampling on the next frame image in the training sample based on different scales in the scale pool to obtain samples of different scales;

calculating the response values of samples at each scale based on the preset scale filter to obtain the samples at the scale with the highest response value;

the sample with the largest scale of the response value is adjusted to the same dimension as the template of the current frame by the bilinear interpolation to obtain the candidate region of the image of the next frame in the training sample.

4. The target tracking method of claim 1, wherein the steps of iterating a target tracking model when the response value meets a preset confidence threshold comprises:
   obtaining the correlation peak mean difference ratio (CPMDR) based on the distribution map corresponding to the response values;
   obtaining a model update rate based on the correlation peak mean difference ratio (CPMDR), and updating the target model based on the model update rate.

5. A target tracking system, comprising:
   a construction template circuit determining a target area based on a current frame of a training sample in a video, extracting and fusing histogram of oriented gradient (HOG), color naming (CN), and color space HSV features of the target area to obtain a target template;
   a target function circuit determining a target function according to the target template and a spatial regularization weight factor;
   a model training circuit introducing the Sherman-Morrison formula into an alternating direction method of multipliers (ADMM) to accelerate solving the target function and obtain a response value;
   a target tracking circuit iterating the target tracking model until the response value meets a preset confidence threshold to complete training to obtain a trained target tracking model, and tracking the target in the video to be observed by using the trained target tracking model;
   wherein the steps of introducing the Sherman-Morrison formula into the alternating direction method of multipliers (ADMM) to accelerate solving the target function and obtain the response value include:
   constructing an auxiliary variable and substituting the auxiliary variable into a loss function of a filter to obtain a converted loss function, wherein, the auxiliary variable is substituted into the loss function of the filter to obtain the converted loss function as:

$$\arg\min_{\omega,\beta} \frac{1}{2} \sum_{i=1}^{t} \left\| \sum_{j=1}^{d} x_i^j * \beta^j - y_i \right\|^2 + \frac{1}{2} \sum_{j=1}^{d} \|\theta \odot \omega^j\|^2 \text{ such that } \beta = \omega$$

where, $\odot$ is a dot product operation, $\omega$ is the trained filter coefficient, $\beta$ is the auxiliary variable, t represents the sequence number of the current frame, i represents the sequence number of the historical frame, d is the dimension of the classifier, j is the number of channels for the filter, $x_i$ is the input sample of the i-th frame, $y_i$ represents the expected response of the sample of the i-th frame, and $\theta$ is the weight factor;

Fourier transform the loss function to obtain a corresponding frequency domain formula, wherein, the corresponding frequency domain formula obtained by Fourier transformation of the loss function is:

$$\arg\min_{\omega,\beta} \frac{1}{2} \|\hat{y} - \hat{X}\hat{\beta}\|_2^2 + \frac{1}{2} \|\theta\omega\|_2^2 \text{ such that } \hat{\beta} = \sqrt{t} F\omega$$

where, $\hat{}$ represents the Fourier transform of the variable, $\omega$ is the trained filter coefficient, $\beta$ is the auxiliary variable, $\theta$ is the weight factor, the discrete Fourier transform of a one-dimensional signal a is represented as $\hat{a} = \sqrt{t}Fa$, wherein, F is the orthogonal Fourier transform matrix of size t×t, $\hat{y} = [\hat{y}(1), \hat{y}(2), \ldots, \hat{y}(t)]$, $\hat{X} = [\text{diag}(\hat{x}_1)^T, \ldots, \text{diag}(\hat{x}_d)^T]$, in size t×dt, which is a matrix composed of multi-channel cyclic samples, $\hat{\beta} = [\hat{\beta}_1^T, \ldots, \hat{\beta}_d^T]$, in size dt×1;

constructing an augmented Lagrange function based on the corresponding frequency domain formula, and introducing the Sherman-Morrison formula into the alternating direction method of multipliers (ADMM) to accelerate solving the Lagrange function and obtain the response value; wherein, the augmented Lagrangian function constructed based on the corresponding frequency domain formula is:

$$L(\hat{\omega}, \hat{\beta}, \hat{\zeta}) = \frac{1}{2}\|\hat{y} - \hat{X}\hat{\beta}\|_2^2 + \frac{1}{2}\|\theta\omega\|_2^2 + \hat{\zeta}^T(\hat{\beta} - \sqrt{t}F\omega) + \frac{\mu}{2}\|\hat{\beta} - \sqrt{t}F\omega\|_2^2$$

wherein $\mu$ is the penalty factor, $\hat{\zeta} = [\hat{\zeta}_1^T, \ldots, \hat{\zeta}_K^T]^T$ is the Lagrangian vector in the Fourier domain of size dt×1, $\hat{}$ represents the Fourier transform of the variable, $\omega$ is the trained filter coefficient, $\beta$ is the auxiliary variable, $\theta$ is the weight factor, the discrete Fourier transform of a one-dimensional signal a is represented as $\hat{a} = \sqrt{t}Fa$, wherein, F is the orthogonal Fourer transform matrix of size t×t, $\hat{y} = [\hat{y}(1), \hat{y}(2), \ldots, \hat{y}(t)]$, $\hat{X} = [\text{diag}(\hat{x}_1)^T, \ldots, \text{diag}(\hat{x}_d)^T]$, in size t×dt, wherein the steps of introducing Sherman-Morrison formula into the alternating direction method of multipliers (ADMM) to accelerate solving the Lagrange function comprises:

using the alternating direction method of multipliers (ADMM) to decompose the augmented Lagrange function into multiple subproblems; wherein the alternating direction method of multipliers (ADMM) is used to decompose the augmented Lagrange function into multiple subproblems:

$$\hat{\beta} = \arg\min_{\hat{\beta}(s)} \frac{1}{2}\|\hat{y} - \hat{X}\hat{\beta}\|_2^2 + \hat{\zeta}^T(\hat{\beta} - \sqrt{t}F\omega) + \frac{\mu}{2}\|\hat{\beta} - \sqrt{t}F\omega\|_2^2$$

wherein $\mu$ is the penalty factor, $\hat{\zeta} = [\hat{\zeta}_1^T, \ldots, \hat{\zeta}_K^T]^T$ is the Lagrangian vector in the Fourier domain of size dt×1, $\hat{}$ represents the Fourier transform of the variable, $\omega$ is the trained filter coefficient, $\beta$ is the auxiliary variable, $\theta$ is the weight factor, the discrete Fourier transform of a one-dimensional signal a is represented as $\hat{a} = \sqrt{t}Fa$, wherein, F is the orthogonal Fourer transform matrix of size t×t, $\hat{y} = [\hat{y}(1), \hat{y}(2), \ldots, \hat{y}(t)]$, $\hat{X} = [\text{diag}(\hat{x}_1)^T, \ldots, \text{diag}(\hat{x}_d)^T]$, in size t×dt, which is a matrix composed of multi-channel cyclic samples, $\hat{\beta} = [\hat{\beta}_1^T, \ldots, \hat{\beta}_d^T]$, in size dt×1; sample $\hat{X}$ is a banded sparse matrix, so each element in $\hat{y} = [\hat{y}(1), \hat{y}(2), \ldots, \hat{y}(t)]$, $\hat{X} = [\text{diag}(\hat{x}_1)^T, \ldots, \text{diag}(\hat{x}_d)^T]$ and $\hat{\beta} = [\text{conj}(\hat{\beta}_1(t)), \ldots, \text{conj}(\hat{\beta}_k(t))]^T$, and operator conj applies complex conjugate to complex vectors; therefore, $\hat{\beta}$ in the above equation can be equivalent to t independent small targets $\hat{\beta}(s), s = [1, \ldots, t]$;

decomposing each subproblem into preset multiple independent small targets based on the banded sparse matrix of the samples, wherein, each subproblem is decomposed into preset independent small targets based on the banded sparse matrix of samples:

$$\hat{\beta}(s) = \arg\min_{\hat{\beta}(s)} \frac{1}{2}\|\hat{y}(s) - \hat{x}(s)^T\hat{\beta}(s)\|_2^2 + \hat{\varsigma}(s)^T(\hat{\beta} - \omega(s)) + \frac{\mu}{2}\|\hat{\beta}(s) - \hat{\omega}(s)\|_2^2;$$

where, $\hat{\omega}(s)=[\hat{\omega}_1(s), \ldots, \hat{\omega}_k(s)]$ and $\hat{\omega}_k=\sqrt{t}F\omega_k$, are solved as follows:

$$\hat{\beta}(s) = \frac{\hat{y}(s)\hat{x}(s) - t\hat{\varsigma}(s) + \mu t\hat{\omega}(s)}{\hat{x}(s)\hat{x}(s)^T + \mu t I_k}$$

accelerating a solution of each independent small target according to the Sherman-Morrison, wherein the solution is accelerated for each independent small target according to the Sherman-Morrison formula:

$$\hat{\beta}(s) = \frac{1}{\mu}(t\hat{y}(s)\hat{x}(s) - \hat{\varsigma}(s) + \mu\hat{\omega}(s)) - \frac{\hat{x}(s)}{\mu b}(t\hat{y}(s)\widehat{S_x}(s) - \hat{S}_\varsigma(s) + \mu\widehat{S_\omega}(s))$$

where $\widehat{S_x}(s)=\hat{x}(s)^T\hat{x}$, $\hat{S}_{\varsigma(s)=\hat{x}(s)}{}^T\varsigma$, $\widehat{S_x}(s)=\hat{x}(s)^T\hat{\omega}$, $b=\widehat{S_x}(s)+\mu t$.

6. An electronic device, comprising a memory and a processor, which are used to execute computer management programs stored in the memory and implement on the processor the steps of a target tracking method as claimed in claim 1.

7. A non-transitory computer-readable storage medium with a computer management program is stored on the non-transitory computer-readable storage medium, and the step of implementing the target tracking method as claimed in claim 1 when the computer management program is executed by a processor.

\* \* \* \* \*